(12) United States Patent
Singh et al.

(10) Patent No.: US 9,235,447 B2
(45) Date of Patent: Jan. 12, 2016

(54) EXTENSIBLE ATTRIBUTE SUMMARIZATION

(75) Inventors: Sumeet Singh, Saratoga, CA (US); Ashok Ganesan, San Jose, CA (US); Erik David Ludvigson, Pleasanton, CA (US); Subrata Banerjee, Los Altos, CA (US); Ethan M. Spiegel, Mountain View, CA (US); Sukhdev S. Kapur, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 739 days.

(21) Appl. No.: 13/039,721

(22) Filed: Mar. 3, 2011

(65) Prior Publication Data

US 2012/0226790 A1    Sep. 6, 2012

(51) Int. Cl.
*G06F 15/173* (2006.01)
*G06F 9/50* (2006.01)
*H04L 12/24* (2006.01)

(52) U.S. Cl.
CPC .............. *G06F 9/5072* (2013.01); *G06F 9/50* (2013.01); *H04L 41/00* (2013.01); *H04L 41/50* (2013.01)

(58) Field of Classification Search
CPC ... G06F 9/5072; G06F 9/50; G06F 17/30424; G06F 17/20; G06F 17/30705; H04L 41/50; H04L 41/00
USPC ........................................................ 709/223
See application file for complete search history.

(56) References Cited

U.S. PATENT DOCUMENTS

| | | |
|---|---|---|
| 6,259,705 B1 | 7/2001 | Takahashi et al. |
| 7,200,589 B1 | 4/2007 | Graupner |
| 7,457,835 B2 | 11/2008 | Toebes et al. |
| 7,543,020 B2 | 6/2009 | Walker et al. |
| 7,634,566 B2 | 12/2009 | Turner et al. |
| 7,747,720 B2 | 6/2010 | Toebes et al. |
| 7,752,311 B2 | 7/2010 | Walker et al. |
| 7,870,420 B2 | 1/2011 | Lloyd et al. |
| 8,255,529 B2 | 8/2012 | Ferris et al. |

(Continued)

FOREIGN PATENT DOCUMENTS

| | | | |
|---|---|---|---|
| WO | 2004110023 A1 | 12/2004 | |
| WO | WO 2004110023 A1 * | 12/2004 | ............... H04L 29/06 |

OTHER PUBLICATIONS

Java Message Service API Tutorial, by Kim Haase (2002), Sun Microsystems, Inc. (278 pages).

(Continued)

*Primary Examiner* — Jude Jean Gilles
*Assistant Examiner* — Jaren M. Means
(74) *Attorney, Agent, or Firm* — Edell, Shapiro & Finnan, LLC

(57) ABSTRACT

In one embodiment a method includes at first a network device, identifying an attribute of the first network device, selecting a function that defines how the attribute is to be summarized together with a same attribute of a second network device, generating a message that comprises a set of information comprising an identification of the attribute and the function, and sending the message to, e.g., a next higher node in a network hierarchy of which the network device is a part. Multiple such messages may be received at an aggregation node that then summarizes the attributes according to respective functions, and sends or publishes a summarized version of the attributes to a still next higher node in the network hierarchy.

24 Claims, 6 Drawing Sheets

| Dest Address | Source Address | # of Attributes | $ATT_1$, $Value_1$, $Function_1$ | $ATT_2$, $Value_2$, $Function_2$ | ....... | $ATT_n$, $Value_n$, $Function_n$ |
|---|---|---|---|---|---|---|

500

(56) References Cited

U.S. PATENT DOCUMENTS

| | | |
|---|---|---|
| 8,271,653 B2 | 9/2012 | DeHaan |
| 2005/0022202 A1 | 1/2005 | Sannapa Reddy et al. |
| 2005/0033843 A1 | 2/2005 | Shahi et al. |
| 2005/0215265 A1 | 9/2005 | Sharma et al. |
| 2005/0223026 A1* | 10/2005 | Chaudhuri et al. ....... 707/103 R |
| 2005/0283645 A1 | 12/2005 | Turner et al. |
| 2006/0072582 A1* | 4/2006 | Bronnimann et al. ... 370/395.32 |
| 2006/0179106 A1 | 8/2006 | Turner et al. |
| 2006/0212532 A1 | 9/2006 | Burckart et al. |
| 2006/0242300 A1 | 10/2006 | Yumoto et al. |
| 2007/0121490 A1 | 5/2007 | Iwakawa et al. |
| 2008/0086567 A1 | 4/2008 | Langen et al. |
| 2008/0238919 A1 | 10/2008 | Pack |
| 2008/0256549 A1* | 10/2008 | Liu et al. ...................... 718/106 |
| 2009/0245113 A1 | 10/2009 | Kamiya |
| 2009/0287825 A1 | 11/2009 | Walker et al. |
| 2010/0223378 A1 | 9/2010 | Wei |
| 2010/0223382 A1 | 9/2010 | Rayes et al. |
| 2010/0228819 A1 | 9/2010 | Wei |
| 2010/0250668 A1 | 9/2010 | Toebes et al. |
| 2010/0251329 A1 | 9/2010 | Wei |
| 2010/0287280 A1 | 11/2010 | Sivan |
| 2010/0332588 A1 | 12/2010 | Schwimer |
| 2010/0333116 A1* | 12/2010 | Prahlad et al. ................ 719/328 |
| 2011/0022642 A1 | 1/2011 | deMilo et al. |
| 2011/0066728 A1 | 3/2011 | Gauthier et al. |
| 2011/0126197 A1 | 5/2011 | Larsen et al. |
| 2011/0137805 A1 | 6/2011 | Brookbanks et al. |
| 2011/0138050 A1 | 6/2011 | Dawson et al. |
| 2011/0145439 A1 | 6/2011 | Chaturvedi et al. |
| 2011/0173324 A1 | 7/2011 | Wang et al. |
| 2011/0179132 A1 | 7/2011 | Mayo et al. |
| 2011/0179162 A1 | 7/2011 | Mayo et al. |
| 2011/0289162 A1 | 11/2011 | Furlong et al. |
| 2011/0295998 A1 | 12/2011 | Ferris et al. |
| 2011/0320605 A1 | 12/2011 | Kramer et al. |
| 2012/0030343 A1 | 2/2012 | Ryder |
| 2012/0054332 A1 | 3/2012 | Sahu et al. |
| 2012/0054345 A1 | 3/2012 | Sahu et al. |
| 2012/0054626 A1 | 3/2012 | Odenheimer |
| 2012/0060165 A1 | 3/2012 | Clarke |
| 2012/0179802 A1* | 7/2012 | Narasimhan et al. ......... 709/223 |
| 2012/0224486 A1 | 9/2012 | Battestilli et al. |
| 2012/0226789 A1 | 9/2012 | Ganesan et al. |
| 2012/0226790 A1 | 9/2012 | Singh |
| 2012/0226797 A1 | 9/2012 | Ghosh et al. |
| 2012/0226799 A1 | 9/2012 | Kapur et al. |
| 2012/0311144 A1 | 12/2012 | Akelbein et al. |
| 2013/0044741 A1 | 2/2013 | Lappetelainen et al. |
| 2013/0080517 A1 | 3/2013 | T'Syen et al. |

OTHER PUBLICATIONS

XMPP XEP-0051: Connection Transfer, Klaus Wolf et al., (1999), XMPP Standards Foundation, (5 pages).

Rich Miller, "Can Amazon be a Player in Disaster Recovery?," Data Center Knowledge, Mar. 12, 2009, pp. 1-8.

Rich Miller, "How Google Routes Around Outages," Data Center Knowledge, Mar. 25, 2009, pp. 1-12.

Detecting Anomalies by Data Aggregation in the Power Grid, Nguyen, Hoang et al.,University of Illinois, Computer Science Research and Tech Reports, Jul. 2006.

International Search Report and Written Opinion in International Application No. PCT/US2012/027069, mailed Jul. 3, 2012.

* cited by examiner

| Attribute | Value | Metadata |
|---|---|---|
| # of processors | 4 | Sum |
| Frequency | 1.2 GHz | Lesser_Of |
| Disk capacity | 500GB | Sum |
| Application1 | Word Processor | Concat |
| Application2 | Spreadsheet | Concat |

*Fig. 4*

| Dest Address | Source Address | # of Attributes | $ATT_1$, $Value_1$, $Function_1$ | $ATT_2$, $Value_2$, $Function_2$ | ........ | $ATT_n$, $Value_n$, $Function_n$ |
|---|---|---|---|---|---|---|

EXTENSIBLE ATTRIBUTE SUMMARIZATION

TECHNICAL FIELD

The present disclosure relates to cloud computing and, more particularly, to methodologies by which capabilities or attributes of multiple cloud resource devices that are available to users of the cloud can be aggregated or summarized at, e.g., a next higher level within a network hierarchy of the cloud.

BACKGROUND

"Cloud computing" can be defined as Internet-based computing in which shared resources, software and information are provided to client or user computers or other devices on-demand from a pool of resources that are communicatively available via the Internet, or other electronic network. Cloud computing is envisioned as a way to democratize access to resources and services, letting users efficiently purchase as many resources as they need and/or can afford.

In some possible implementations, cloud computing comprises linking backend resources (e.g., memory, processors, etc.) to provide web-based services, applications, and data storage. This approach has the potential effect of providing services at lower cost than current options, and with less complexity, greater scalability, and wider reach. However, linking the capabilities of such backend systems to each other and to client or user devices can be daunting, especially in view of the fact that there may be many thousands of such backend systems, clients and users, each having different capabilities, attributes and needs.

BRIEF DESCRIPTION OF THE DRAWINGS

FIG. 4 depicts an example table that lists attributes and metadata that can be maintained by a cloud resource device consistent with the Attribute Summarization Logic.

FIG. 5 is an example publish message that can be sent from a cloud resource device to a next higher (aggregation) node in a network hierarchy.

DESCRIPTION OF EXAMPLE EMBODIMENTS

Overview

In one embodiment a method includes, at first a network device, identifying an attribute of the first network device, selecting a function that defines how the attribute is to be summarized together with a same attribute of a second network device, generating a message that comprises a set of information comprising an identification of the attribute and the function, and sending the message to a next higher node in a network hierarchy of which the network device is a part. Multiple such messages may be received at an aggregation node that then summarizes the attributes according to respective functions, and sends or publishes a summarized version of the attributes to yet another node in the network.

Example Embodiments

Figure 1:
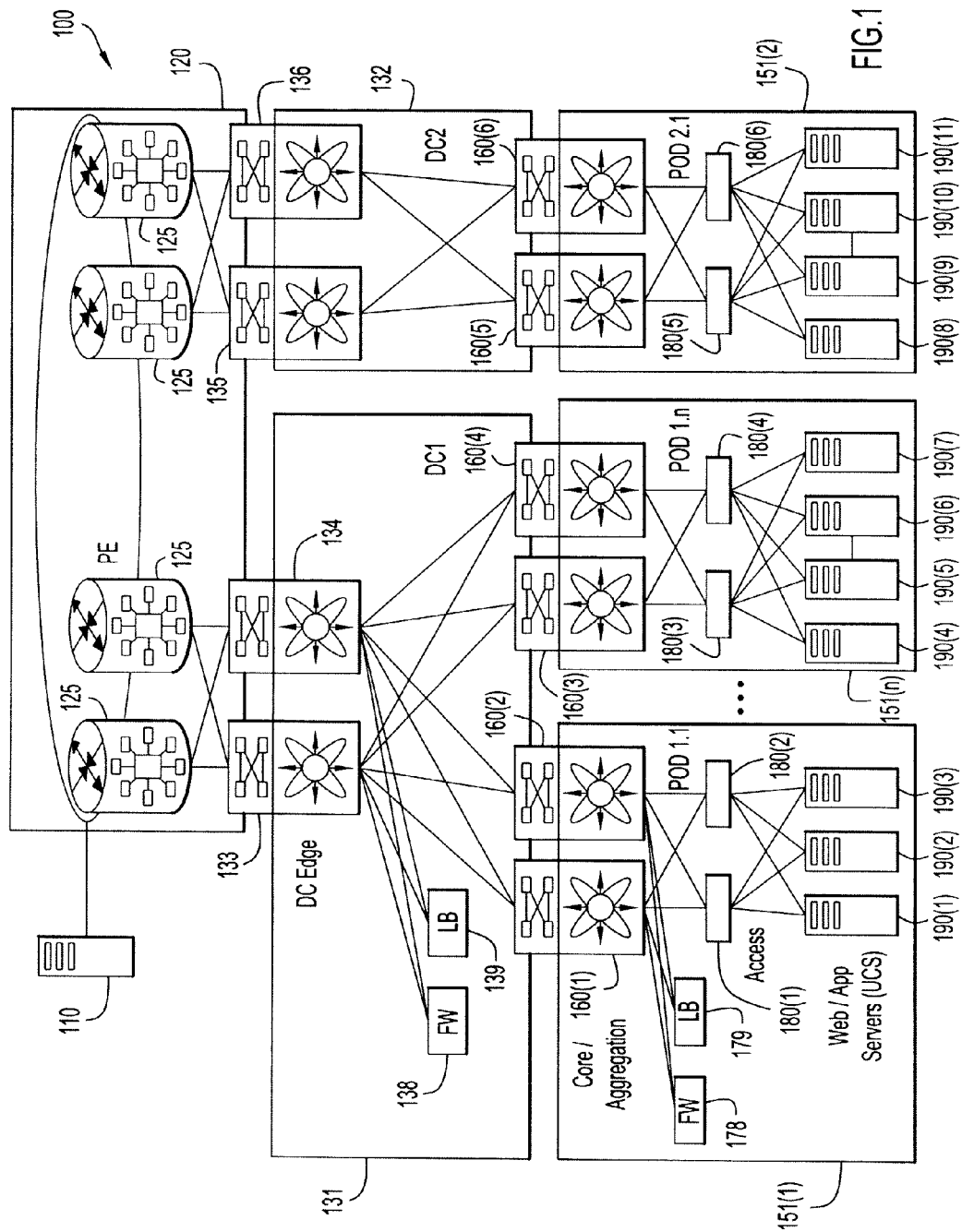
FIG. 1 depicts a schematic diagram of a network topology that supports cloud computing and that operates in accordance with attribute summarization techniques.

FIG. 1 depicts a schematic diagram of a network topology 100 that supports cloud computing and that operates in accordance with attribute summarization techniques. A top level network 120 interconnects a plurality of routers 125. Some of these routers 125 may be Provider Edge routers that enable connectivity to Data Centers 131, 132 via Data Center (DC) Edge routers 133, 134, 135, 136. Other routers 125 may be employed exclusively internally to top level network 120 as "core" routers, in that they may not have direct visibility to any DC Edge router.

Each Data Center 131, 132 (and using Data Center 131 as an example) may comprise DC Edge routers 133, 134 (as mentioned), a firewall 138, and a load balancer 139. These elements operate together to enable "pods" 151(1)-151(n), 152(1), etc., which respectively include multiple cloud resource devices 190(1)-190(3), 190(4)-190(7), 190(8)-190(11), to communicate effectively through the network topology 100 and provide computing and storage services to, e.g., clients 110, which may be other Data Centers or even stand alone computers. In a publish-subscriber system, which is one way to implement such a cloud computing environment, clients 110 are subscribers to requested resources and the cloud resource devices 190(1)-190(3), 190(4)-190(7), 190(8)-190(11) (which publish their services, capabilities, etc.) are the ultimate providers of those resources, although the clients themselves may have no knowledge of which specific cloud resource devices actually provide the desired service (e.g., compute, storage, etc.).

Still referring to FIG. 1, each Data Center pod, e.g., 151(1), may comprise one or more aggregation nodes 160(1), 160(2), etc. that are in communication with the multiple cloud resource devices 190 via access switches 180(1), 180(2), as may be appropriate. A firewall 178 and load balancer 179 may also be furnished for each pod 151 to ensure security and improve efficiency of connectivity with upper layers of network topology 100.

Figure 2:
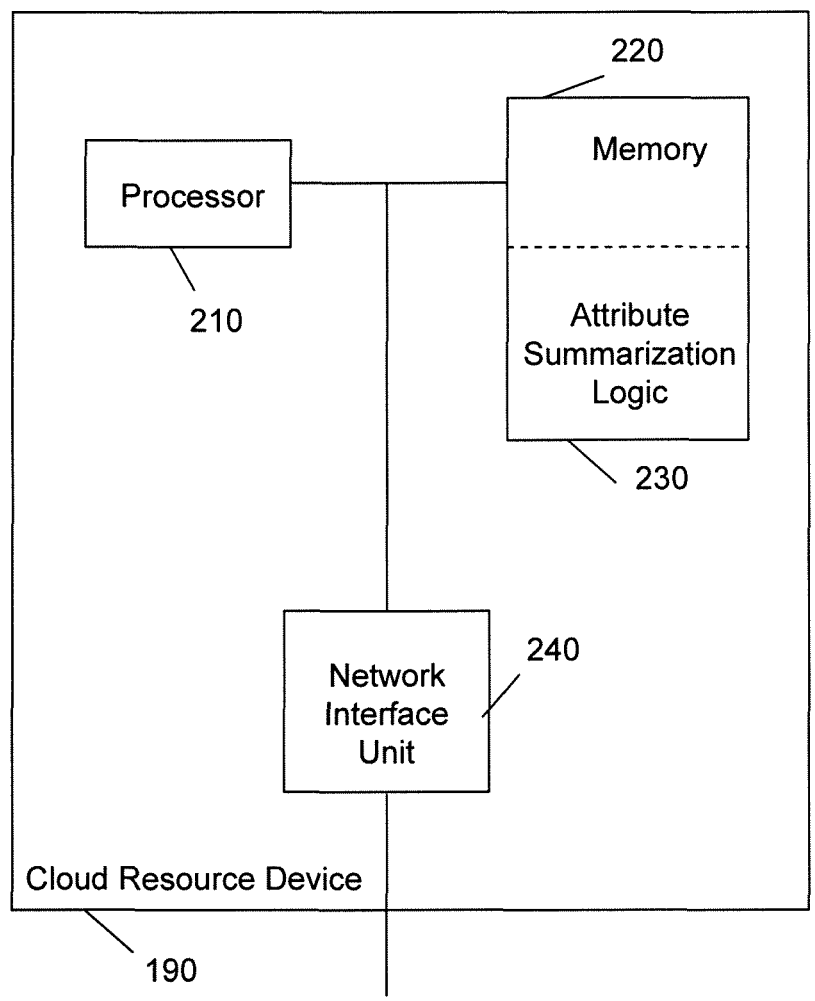
FIG. 2 depicts a cloud resource device such as a web or application server, or storage device that includes Attribute Summarization Logic.

Cloud resource devices 190 themselves may be web or application servers, storage devices such as disk drives, or any other computing resource that might be of use or interest to an end user, such as client 110. FIG. 2 depicts an example cloud resource device 190 that comprises a processor 210, associated memory 220, which may include Attribute Summarization Logic 230 the function of which is described below, and a network interface unit 240 such as a network interface card, which enables the cloud resource device 190 to communicate externally with other devices. Although not shown, each cloud resource device 190 may also include input/output devices such as a keyboard, mouse and display to enable direct control of a given cloud resource device 190. Those skilled in the art will appreciate that cloud resource devices 190 may be rack mounted devices, such as blades, that may not have dedicated respective input/output devices. Instead, such rack mounted devices might be accessible via a centralized console, or some other arrangement by which individual ones of the cloud resource devices can be accessed, controlled and configured by, e.g., an administrator.

Figure 3:
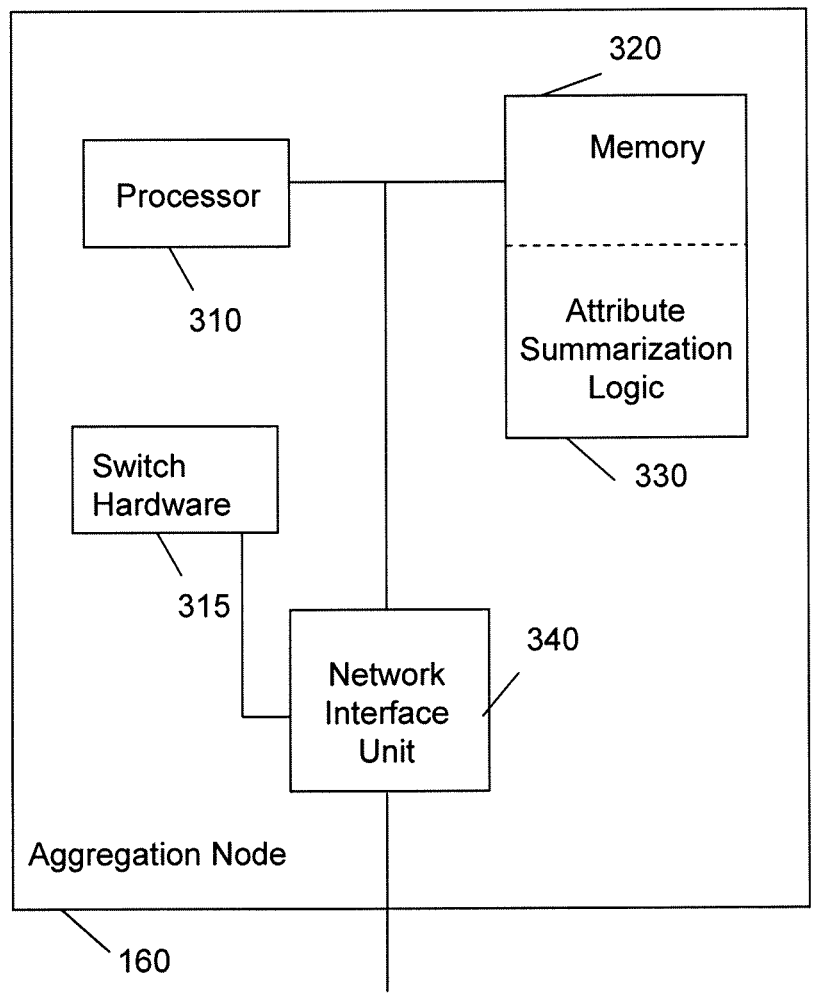
FIG. 3 depicts an aggregation node, such as an edge device, that includes Attribute Summarization Logic.

FIG. 3 depicts an example aggregation node 160, which, like a cloud resource device 190, may comprise a processor 310, associated memory 320, which may include Attribute Summarization Logic 330, and a network interface unit 340, such as a network interface card. Switch hardware 315 may also be included. Switch hardware 315 comprises one or application specific integrated circuits and supporting circuitry to buffer/queue incoming packets and route the packets over a particular port to a destination device. The switch hardware 315 may include its own processor that is configured to apply class of service, quality of service and other policies to the routing of packets." Aggregation node 160 may also be accessible via input/output functionality including functions supported by, e.g., a keyboard, mouse and display to enable direct control of a given aggregation node 160.

Processors 210/310 may be programmable processors (microprocessors or microcontrollers) or fixed-logic processors. In the case of a programmable processor, any associated memory (e.g., 220, 320) may be of any type of tangible processor readable memory (e.g., random access, read-only, etc.) that is encoded with or stores instructions that can implement the Attribute Summarization Logic 230, 330. Alternatively, processors 210, 310 may be comprised of a fixed-logic processing device, such as an application specific integrated circuit (ASIC) or digital signal processor that is configured with firmware comprised of instructions or logic that cause the processor to perform the functions described herein. Thus, Attribute Summarization Logic 230, 330 may be encoded in one or more tangible media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in a processor or computer readable medium that is encoded with instructions for execution by a processor that, when executed by the processor, are operable to cause the processor to perform the functions described herein.

As noted, there can be many different types of cloud resource devices 190 in a given network including, but not limited to, compute devices, network devices, storage devices, service devices, etc. Each of these devices can have a different set of capabilities or attributes and these capabilities or attributes may change over time. For example, a larger capacity disk drive might be installed in a given storage device, or an upgraded set of parallel processors may be installed in a given compute device. Furthermore, how a cloud, particularly one that operates consistent with a publish-subscribe model, might view or present/advertise these capabilities or attributes in aggregate to potential subscribers may vary from one capability or attribute type to another.

More specifically, in one possible implementation of a cloud computing infrastructure like that shown in FIG. 1, including the devices shown in FIGS. 2 and 3, it may be desirable to advertise or publish the capabilities or attributes of each of the cloud resource devices 190 (or some aggregated version of those capabilities or attributes) throughout the cloud or network. That is, to effect efficient cloud computing, a network wide hierarchical property and capability map of all network attached entities (e.g., cloud resource devices 190) could be automatically generated by having the devices independently publish (advertise) their capabilities via the publish-subscribe mechanism. However, relaying all such information as it is published by each of the cloud resource devices 190 to all potential subscribers (higher level nodes, and clients, in the network hierarchy), might easily result in an overload of messages, and unnecessarily bog down the receivers/subscribers. For this reason, the publish-subscribe mechanism, consistent with the Attribute Summarization Logic 230/330, is configured to summarize device attributes within respective domains, and then publish resulting summarizations to a next higher level domain in the overall network topology 100.

In one embodiment, the capabilities or attributes published by devices (e.g., cloud resource devices 190) in a domain at the lowest layer of the network hierarchy (e.g., within pod 151) are summarized/aggregated into a common set of capabilities associated with the entire domain. Thus, referring again to FIG. 1, the capabilities of individual cloud resource devices 190 within, e.g., Data Center pod 151(1) are associated with the entire Data Center pod as a whole, without any notion of the different cloud resource devices 190 within Pod 151 or the connectivity between such devices 190 via, e.g., access switches 180. As will be explained more fully below, aggregation and summarization of capabilities and attributes continues from each layer of the hierarchy to the next, enabling clients/subscribers to obtain the services they desire without bogging down the overall network.

In an embodiment, each device can advertise (publish) its capabilities or attributes on a common control plane. Such a control plane could be implemented using a presence protocol such as XMPP (eXtensible Markup Presence Protocol), among other possible protocols or mechanisms that enable devices to communicate with each other.

Significantly, and in an effort to maintain a certain level of automation in the attribute summarization process, not only is a given attribute published or advertised, but an extensible aggregation function is provided along with that given attribute that enables the device that is publishing the attributes to specify the manner in which the attribute should be treated/aggregated or summarized at a next higher level in the network hierarchy. Extensibility in this context is desirable as different attributes may need to be summarized differently. For example, depending on the type of attribute, the attribute may be summarized with other like attributes of other devices via primitives such as concatenation, addition, selection of a lesser of values, etc. In one implementation, the Attribute Summarization Logic 230/330 may provide and/or support a comprehensive list of primitive aggregation functions (e.g., SUM, MULTIPLY, DIFFERENCE, AVERAGE, STANDARD DEVIATION, CONCATENATION, LENGTH, LESSER_OF, GREATER_OF, MAX, MIN, UNION, INTERSECTION, etc.), and the devices can then specify which one of (or combination of) the primitive functions to use when the attributes of a given device are to be summarized. The selection of a primitive aggregation function could be performed automatically, or may be performed manually by an administrator.

FIG. 4 depicts a table that lists example attributes and metadata related to the attributes that can be maintained by, e.g., cloud resource device 190 consistent with the Attribute Summarization Logic 230/330. Specifically, assume the cloud resource device 190 is a general purpose server device that includes multiple processors (cores), has a certain disk drive capacity, and hosts multiple applications ($App_1$, $App_2$). As shown in the table of FIG. 4, each of the foregoing attributes is associated with metadata (e.g., a function) that describes how each attribute should be summarized with other like attributes of other, e.g., cloud resource devices 190. Specifically, the attribute "# of processors" is associated with the primitive "SUM" as its metadata. This means that when this particular attribute is published to a next higher level node in the network topology 100, e.g., aggregation server 160, that node will take the number of processors (4 in this case, as shown in the value column of the table) and add it to any currently running tally of number of processors. Thus, assume, for example, that a given client 110 seeks the processing power of eight processors, and an aggregation server 160 might have added together the number of processors from each of multiple cloud resource devices 190 resulting in a total of 20 such processors. Accordingly, from the perspective the client 110, the Aggregation server 160 can provide the power of eight processors.

Still with reference to FIG. 4, the attribute of disk capacity might also be associated with the metadata "SUM" as an instruction on how to summarize this attribute with similar attributes. For the applications ($App_1$, $App_2$) that might be hosted on the general purpose server, those applications might be associated with a concatenation instruction or function such that a list of applications might result upon summarization. For instance, a resulting summarization might be: "word processor, spreadsheet, relational database" or some numerical value of those applications. A next higher node in the network topology would receive this summarized list and be able match the list of portions thereof to subscribe messages generated by clients 110.

FIG. 5 is an example publish message 500 that can be sent from a cloud resource device 190 to a next higher node, e.g., aggregation server 160, in a network element hierarchy. In an embodiment, the Attribute Summarization Logic 230 generates the message 500 from data like that shown in the table of FIG. 4. The message 500 may include a destination address (a next higher node), a source address (that identifies, e.g., the cloud resource device 190) and one or more attributes that characterize the cloud resource device 190. As shown, each attribute ($Att_1, Att_2, \ldots Att_n$) has associated metadata including a value along with an instruction, directive or function that provides a rule by which the associated attribute should be summarized with other like attributes of other cloud resource devices. Thus, each publish message 500 might be thought of as a tuple (or set of information) of any predetermined length that includes an attribute and metadata that describes a value of the attribute and a function, instruction, directive, etc. regarding how to combine the associated attribute (or value thereof) with other like attributes.

In light of the foregoing, those skilled in the art will appreciate that the Attribute Summarization Logic 230 enables each device to independently determine the attributes that it would like to advertise or publish. The Attribute Summarization Logic 230 also enables the device to provide metadata about those attributes. This approach allows for attributes, which are not a priori known or understood by a next higher node carrying out the summarization function, to still be intelligently summarized/aggregated and then published at a still next layer up in the hierarchy. In one possible implementation, cloud resource devices 190 could provide customers with the ability to configure their own attributes that are not understood by the devices themselves, but are intelligently summarized/aggregated and published up the hierarchy, then referenced in customer policies for hierarchical rendering and provisioning of services.

The following is another example of how the Attribute Summarization Logic 230 may operate. Consider an example of advertising "compute" power through the network hierarchy. Each cloud resource device can advertise the number of cores it has available along with the operating frequency of each core. For example, Device A advertises 4C@1.2 Ghz, Device B advertises 4C@1.2 Ghz, and Device C advertises 4C@2.0 Ghz. Each of these cloud resource devices will publish this information to a first logical hop, e.g., aggregation node 160. At that node Attribute Summarization Logic 330 might aggregate or summarize the received information into one advertisement of "8C@1.2 Ghz, 4C@2.0 Ghz." In contrast, a traditional publish-subscribe system might have simply sent or forwarded the three originally received individual advertisements. Note that, in this case, the summarization is not a simple summing operation, but is instead a function. Such a function can make use of one or more operations, including but not limited to SUM, MULTIPLY, DIFFERENCE, AVERAGE, STANDARD DEVIATION, CONCATENATION, LENGTH, LESSER_OF, GREATER_OF, MAX, MIN, UNION, INTERSECTION, among others.

In this particular example, the function underlying summarization is: compare the frequency, and if they are equal then add the number of cores.

More specifically, consider that the elements are arranged in a <key, value> array, where key is the operating frequency and the value is the number of cores. That is, and referring again to FIG. 4, more than one attribute is considered simultaneously for this particular function, where the function might be defined as:

```
aggregation_function(input[ ])
{
    for each element e in input,
        If input speed of e= x Ghz
        {
            output[x] += number of cores in the input;
        }
    return output;
}
```

That is, for each core having a given operating frequency, add that core to a running total. In this way, a next higher node in the network hierarchy can efficiently summarize attributes, or even combinations of attributes of nodes from a next lower level in the network hierarchy.

Those skilled in the art will appreciate that more complex operations might be implemented. For instance, it might be desirable to consider multiple dimensions including, e.g., memory, storage, processor type (PPC, X86, ARM, 32 bit, 64 bit etc.), connectivity, bandwidth, etc. All such attributes can be summarized consistent with instructions or functions delivered in the metadata (which might even include an explicit equation) that is provided along with the attributes in a message like that shown in FIG. 5.

Another example of a summarization function is "intersection," as noted above. For example, it may be desirable to determine the intersection of routing protocols supported in a routing domain across different routers. Consider the following:

Router 1 supports: BGP (Border Gateway Protocol), OSPF (Open Shortest Path First), RIP (Routing Information Protocol), ISIS (Intermediate System to Intermediate System); summarization operator (function)=intersection.

Router 2 supports: BGP, RIP, ISIS; summarization operator (function)=intersection.

Summarized information according to intersection would be: BGP, RIP, ISIS.

Intersection may be a useful function in that all routers in a given routing domain should communicate via the same protocol.

It is apparent that any attempt to aggregate multiple resources from within a given domain into one set of resource values to be advertised to the next higher domain can result in loss of information. There is an inherent tradeoff whenever summarization is introduced: scale is improved, but accuracy is decreased due to loss of detailed information. "Resource groups" are one tool that can help improve the accuracy in representing resources to higher layers in the hierarchy, at the expense of increased amounts of information.

For example, it is not possible to accurately aggregate the following capabilities into only one processing capacity value and one value for available bandwidth:
- 2 GHz processing capacity is reachable through links with 2 Gbps available bandwidth; and
- 10 GHz processing capacity is reachable through links with 500 Mbps available bandwidth.

A conservative approach would advertise 2 GHz processing capacity with 500 Mbps available bandwidth. Requests to a Data Center control point for more than 2 GHz processing capacity that only require 500 Mbps available bandwidth would not be directed, however, to a pod having the above published summarization.

On the other hand, an aggressive approach might result in advertising 10 GHz processing capacity with 2 Gbps available bandwidth. Requests for more than 2 GHz processing capacity along with more than 500 Mbps available bandwidth may still be directed towards the pod, even though such a combination cannot be supported. The pod control point would have to reject this request, leaving the Data Center control point to select a different pod.

In order to advertise such combinations more accurately, the notion of a resource group can be introduced. The combination of capabilities above can be accurately represented by advertising two resource groups for the same network element. One resource group can reflect the combination of 2 GHz processing capacity and 2 Gbps available bandwidth. The other resource group can reflect the combination of 10 GHz processing capacity and 500 Mbps available bandwidth.

Thus, a resource group can be considered a collection of disparate resources collected together into one container for the purposes of accounting and consumption. A particular resource may be merged into one or more resource groups and the composition (which resource types/attributes are aggregated) of a given resource group may change at run-time. New resource groups can be created while the system is in operation.

The publishers of the information may not be aware of resource groups at all or of which resource group they will be a part, as any association into resource groups is performed as the resource advertisements are received and analyzed at next higher levels within the network hierarchy or, more generally, at different nodes not necessarily arranged in a hierarchy.

As an example, suppose the following Resource Group Templates are defined by an administrator:
- "Memory Intensive Apps": this group may comprise cores that have access to 4 GB of RAM.
- "Compute intensive apps": this group may comprise cores that operate at a minimum of 2 Ghz.
- "Bandwidth intensive apps": this group may comprise cores that may be connected using 10 Gbps links.

Now consider cloud resource devices with the following published advertisements:
- "2 cores@2 Ghz@4 GBRAM" connected to a switch using a 1 Gbps link; and
- "4 cores@1Ghz@ 16 GBRAM" connected to the switch using a 10 Gbps link.

When the advertisements arrive at a next higher level node the node can export three resource groups, namely:
- a "Memory Intensive" resource group with the advertisement "5 units" (20 GBRAM/4);
- a "Compute Intensive" resource group with the advertisement "2 units" (only 2 cores total operate at least 2 GHz; and
- a "Bandwidth Intensive" resource group with the advertisement "4 units" (only 4 of the cores are connected via a 10 Gbs link).

Figure 6:
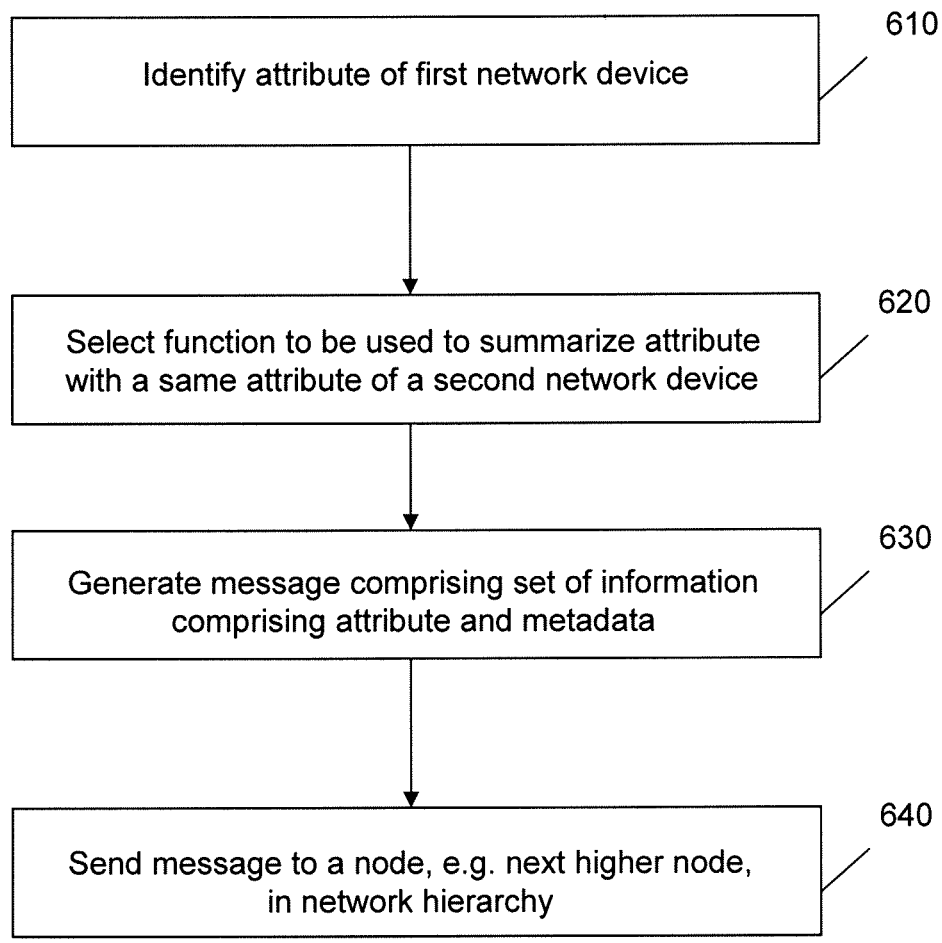
FIGS. 6 and 7 are flow charts depicting example series of steps for operating a system in accordance with the Attribute Summarization Logic.

FIG. 6 is a flow chart depicting an example series of steps for operating a system in accordance with the Attribute Summarization Logic 230. At step 610, at first a network device, an attribute of the first network device is identified. The attribute, such as number of cores/processors, clock frequency, amount of memory etc., may be identified automatically or manually by an administrator.

Then, at step, 620, a function that defines how the attribute is to be summarized together with a same attribute of a second network device is selected. The function could, for example, be any one of count, sum, multiply, divide, difference, average, standard deviation or concatenate and even include a more elaborate equation or program. At step 630, a message is generated that comprises a tuple (or set of information) comprising an identification of the attribute and the function, and then at step 640, the message is sent to a next higher node in a network hierarchy of which the network device is a part. In an embodiment, the message is sent using a presence protocol such as XMPP. Although not required, the first and the second network device may be at a same level within the network hierarchy such that a next higher node in the network hierarchy can receive a plurality of such messages and summarize the attributes of lower level entities. The messages may also be publish or advertisement messages within a publish-subscribe system.

Figure 7:
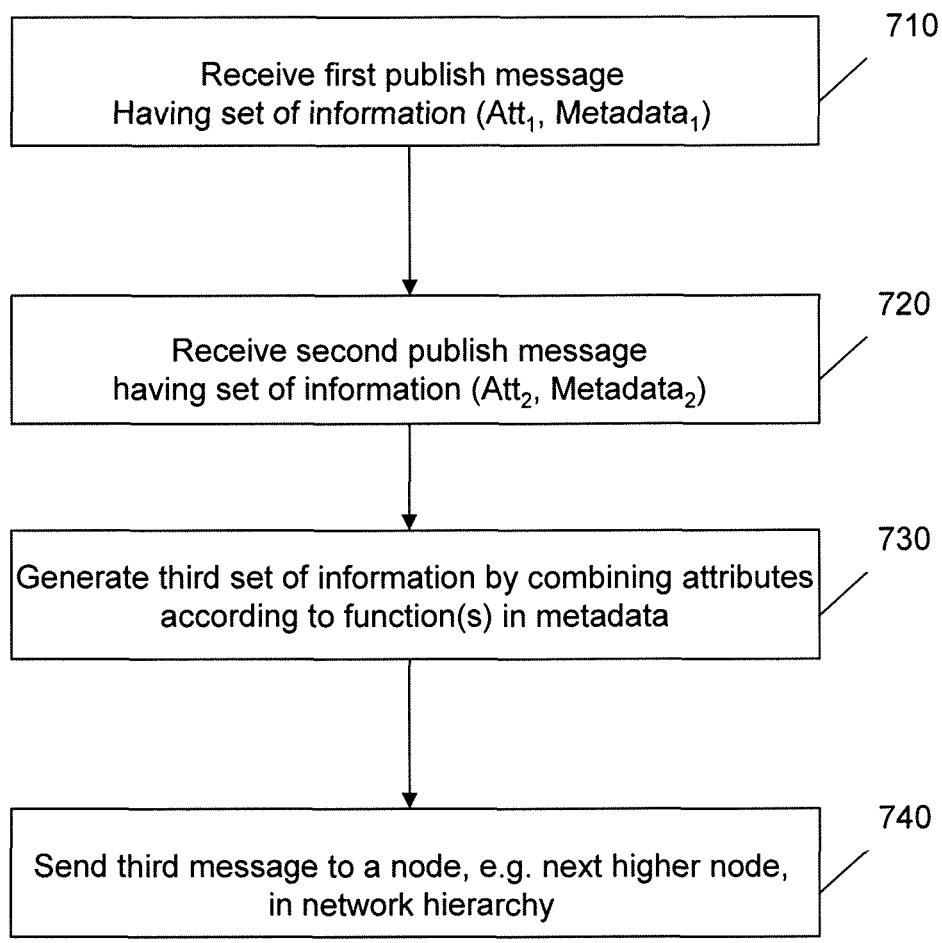

FIG. 7 is a flow chart depicting an example of another series of steps for operating a system in accordance with the Attribute Summarization Logic.

As shown, at step 710, at, e.g., an aggregation node of a data center comprising a plurality of network devices, a first publish message from a first network device is received, and the first publish message from the first network device includes a first tuple (or set of information) having a form ($attribute_1$, $metadata_1$), wherein a given attribute describes a capability of the first network device. At step 720, at, e.g., the same aggregation node of the data center, a second publish message from a second network device is received, and the second publish message from the second server includes a second tuple (or set of information) having the form ($attribute_2$, $metadata_2$). At step 730, a third tuple (or set of information) is generated by combining information in the first tuple and the second tuple consistent with functions defined by the metadata, and at step 740, a third publish message is sent to a next higher aggregation node in a hierarchical structure of which the aggregation node is a member, the third publish message comprising the third tuple.

As explained, the summarizing node can also generate resource groups that combine and summarize attributes from multiple network devices in different ways. Thus, the first publish message and the second publish message may each comprise a plurality of attributes and respective metadata, and the overall methodology may further generate a plurality of groupings (resource groups) that summarize and combine the attributes in different ways to satisfy, perhaps, predetermined templates.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method comprising:
   at a first network device, identifying, by the first network device, an attribute of the first network device;
   selecting, by the first network device, a function that defines how the attribute is to be summarized together with a same attribute of a second network device;
   generating a message that comprises a set of information comprising an identification of the attribute and the function; and
   sending the message to a node in a network of which the network device is a part such that the attribute is thereafter summarized with the same attribute of the second network device in accordance with the function.

2. The method of claim 1, further comprising including in the message a value associated with the attribute.

3. The method of claim 1, wherein the function comprises an equation.

4. The method of claim 1, wherein the function is at least one of SUM, MULTIPLY, DIFFERENCE, AVERAGE, STANDARD DEVIATION, CONCATENATION, LENGTH, LESSER_OF, GREATER_OF, MAX, MIN, UNION, or INTERSECTION.

5. The method of claim 1, wherein sending the message comprises sending the message using a presence protocol.

6. The method of claim 5, wherein the presence protocol is the eXtensible Markup Presence Protocol (XMPP).

7. The method of claim 5, wherein sending the message comprises publishing the message within a publish-subscribe system.

8. An apparatus, comprising:
   a processor;
   a non-transitory memory in communication with the processor; and
   a network interface unit in communication with the processor and the non-transitory memory,
   wherein the processor is configured, along with logic instructions stored in the non-transitory memory, to:
   identify an attribute of the apparatus;
   select a function that defines how the attribute is to be summarized together with a same attribute of another apparatus;
   generate a message that comprises a set of information comprising an identification of the attribute and the function; and
   send the message, via the network interface, to a node in a network of which the apparatus is a part such that the attribute is thereafter summarized with the same attribute of the second network device in accordance with the function.

9. The apparatus of claim 8, wherein the processor is further configured to select, as the function, at least one of SUM, MULTIPLY, DIFFERENCE, AVERAGE, STANDARD DEVIATION, CONCATENATION, LENGTH, LESSER_OF, GREATER_OF, MAX, MIN, UNION, or INTERSECTION.

10. The apparatus of claim 8, wherein the processor is further configured to send the message using a presence protocol.

11. The apparatus of claim 10, wherein the presence protocol is the eXtensible Markup Presence Protocol (XMPP).

12. A method comprising:
   at an aggregation node of a data center comprising a plurality of network devices, receiving a first publish message from a first network device, the first publish message from the first network device including a first set of information having a form ($attribute_1$, metadata), wherein a given attribute describes a capability of the first network device;
   at the aggregation node of the data center, receiving a second publish message from a second network device, the second publish message from the second network device including a second set of information having the form ($attribute_2$, metadata);
   generating a third set of information by combining information in the first set of information and the second set of information in accordance with functions defined by the metadata; and
   sending a third publish message to a next higher aggregation node in a hierarchical structure of which the aggregation node is a member, the third publish message comprising the third set of information.

13. The method of claim 12, wherein the functions defined by the metadata comprises at least one of count, sum, multiply, divide, difference, average, standard deviation or concatenate.

14. The method of claim 12, wherein the first publish message and the second publish message each comprises a plurality of attributes and respective metadata, and the method further comprises generating a plurality of groupings that summarize and combine the attributes in different ways.

15. The method of claim 12, further comprising using respective values associated with the attributes as inputs to at least one of the functions.

16. The method of claim 12, wherein receiving the first and second publish messages comprises receiving via a presence protocol.

17. The method of claim 16, wherein the presence protocol is the eXtensible Markup Presence Protocol (XMPP).

18. An apparatus, comprising:
   a processor;
   a non-transitory memory in communication with the processor; and
   a network interface unit in communication with the processor and the non-transitory memory,
   wherein the processor is configured, along with logic instructions stored in the non-transitory memory, to:
   receive a first publish message from a first network device, the first publish message from the first network device including a first set of information having a form ($attribute_1$, $metadata_1$), wherein a given attribute describes a capability of the first network device;
   receive a second publish message from a second network device, the second publish message from the second server including a second set of information having the form ($attribute_2$, $metadata_2$);
   generate a third set of information by combining information in the first set of information and the second set of information in accordance with functions defined by the metadata; and
   send a third publish message to a next higher aggregation node in a hierarchical structure of which the aggregation node is a member, the third publish message comprising the third set of information.

19. The apparatus of claim 18, wherein the functions defined by the metadata comprise at least one of SUM, MULTIPLY, DIFFERENCE, AVERAGE, STANDARD DEVIATION, CONCATENATION, LENGTH, LESSER_OF, GREATER_OF, MAX, MIN, UNION, or INTERSECTION.

20. The apparatus of claim 18, wherein the first publish message and the second publish message each comprises a plurality of attributes and respective metadata, and the processor is further configured to generate a plurality of groupings that summarize and combine the attributes in different ways.

21. The method of claim 1, wherein generating a message that comprises a set of information comprising an identification of the attribute and the function further comprises generating a message that includes an indication of a number of attributes in the message.

22. The apparatus of claim 8, wherein the processor is further configured to generate a message that includes an indication of a number of attributes in the message.

23. The method of claim 12, receiving the publish message comprises receiving the message including an indication of a number of attributes in the message.

24. The apparatus of claim 18, wherein the processor is configured to receive the first publish message including an indication of a number of attributes in the message.

* * * * *